(12) United States Patent
Mahgerefteh et al.

(10) Patent No.: US 7,991,297 B2
(45) Date of Patent: *Aug. 2, 2011

(54) CHIRPED LASER WITH PASSIVE FILTER ELEMENT FOR DIFFERENTIAL PHASE SHIFT KEYING GENERATION

(75) Inventors: Daniel Mahgerefteh, Palo Alto, CA (US); Xueyan Zheng, Andover, MA (US); Yasuhiro Matsui, Woburn, MA (US); Parviz Tayebati, Boston, MA (US); Andrew C Singer, Champaign, IL (US)

(73) Assignee: Finisar Corporation, Sunnyvale, CA (US)

( * ) Notice: Subject to any disclaimer, the term of this patent is extended or adjusted under 35 U.S.C. 154(b) by 721 days.

This patent is subject to a terminal disclaimer.

(21) Appl. No.: 12/014,676

(22) Filed: Jan. 15, 2008

(65) Prior Publication Data

US 2008/0247763 A1  Oct. 9, 2008

Related U.S. Application Data

(63) Continuation-in-part of application No. PCT/US2007/008729, filed on Apr. 6, 2007.

(51) Int. Cl.
*H04B 10/04* (2006.01)
*H04B 10/18* (2006.01)

(52) U.S. Cl. ......... 398/185; 398/187; 398/188; 398/193

(58) Field of Classification Search .................. 398/185, 398/187, 188, 193

See application file for complete search history.

(56) References Cited

U.S. PATENT DOCUMENTS

| | | | |
|---|---|---|---|
| 3,324,295 A | 6/1967 | Harris | |
| 3,973,216 A | 8/1976 | Hughes et al. | |
| 3,999,105 A | 12/1976 | Archey et al. | |
| 4,038,600 A | 7/1977 | Thomas et al. | |
| 4,561,119 A | 12/1985 | Epworth | |
| 4,671,604 A | 6/1987 | Soref | |
| 4,754,459 A | 6/1988 | Westbrook | |
| 4,805,235 A | 2/1989 | Henmi | |
| 4,841,519 A | 6/1989 | Nishio | |

(Continued)

FOREIGN PATENT DOCUMENTS

CN  1236891  12/1999

(Continued)

OTHER PUBLICATIONS

Alexander et al., Passive Equalization of Semiconductor Diode Laser Frequency Modulation, Journal of Lightwave Technology, Jan. 1989, 11-23, vol. 7, No. 1.

(Continued)

*Primary Examiner* — Nathan M Curs
(74) *Attorney, Agent, or Firm* — Maschoff Gilmore & Israelsen

(57) ABSTRACT

A method for generating D-N-PSK optical signals is disclosed wherein a laser is modulated to generate optical signal pairs including phase modulated and fixed phase portions, the phase modulated portions having a frequency encoding one or more data symbols and the fixed phase portion having a carrier frequency and a phase corresponding to the immediately preceding phase modulated portion. The output of the laser is passed through an optical spectrum reshaper having a transmission function chosen to attenuate a plurality of the phase modulated portions relative to the fixed phase portions. The phase modulated portions may have N frequency levels located on either side of the carrier frequency. One of the N frequency levels may be equal to the carrier frequency.

38 Claims, 5 Drawing Sheets

U.S. PATENT DOCUMENTS

| | | | |
|---|---|---|---|
| 4,896,325 A | 1/1990 | Coldren | |
| 4,908,833 A | 3/1990 | Chraplyvy et al. | |
| 4,914,667 A | 4/1990 | Blonder et al. | |
| 5,088,097 A | 2/1992 | Ono et al. | |
| 5,119,393 A | 6/1992 | Oka et al. | |
| 5,136,598 A | 8/1992 | Weller et al. | |
| 5,170,402 A | 12/1992 | Ogita et al. | |
| 5,177,630 A | 1/1993 | Goutzoulis et al. | |
| 5,293,545 A | 3/1994 | Huber | |
| 5,325,378 A | 6/1994 | Zorabedian | |
| 5,325,382 A | 6/1994 | Emura et al. | |
| 5,371,625 A | 12/1994 | Wedding et al. | |
| 5,394,429 A | 2/1995 | Yamada et al. | |
| 5,412,474 A | 5/1995 | Reasenberg et al. | |
| 5,416,629 A | 5/1995 | Huber | |
| 5,434,693 A | 7/1995 | Tanaka et al. | |
| 5,450,432 A | 9/1995 | Okuda | |
| 5,459,799 A | 10/1995 | Weber | |
| 5,465,264 A | 11/1995 | Buhler et al. | |
| 5,477,368 A | 12/1995 | Eskildsen et al. | |
| 5,550,667 A | 8/1996 | Krimmel et al. | |
| 5,568,311 A | 10/1996 | Matsumoto | |
| 5,592,327 A | 1/1997 | Gabl et al. | |
| 5,642,371 A | 6/1997 | Tohyama et al. | |
| 5,696,859 A | 12/1997 | Onaka et al. | |
| 5,737,104 A | 4/1998 | Lee et al. | |
| 5,777,773 A | 7/1998 | Epworth et al. | |
| 5,805,235 A | 9/1998 | Bedard | |
| 5,856,980 A | 1/1999 | Doyle et al. | |
| 5,920,416 A | 7/1999 | Beylat et al. | |
| 5,946,129 A | 8/1999 | Xu et al. | |
| 5,953,139 A | 9/1999 | Nemecek et al. | |
| 5,953,361 A | 9/1999 | Borchert | |
| 5,974,209 A | 10/1999 | Cho et al. | |
| 6,018,275 A | 1/2000 | Perrett et al. | |
| 6,081,361 A | 6/2000 | Adams et al. | |
| 6,088,373 A | 7/2000 | Hakki | |
| 6,091,743 A | 7/2000 | Yang | |
| 6,096,496 A | 8/2000 | Frankel | |
| 6,104,851 A | 8/2000 | Mahgerefteh | |
| 6,115,403 A | 9/2000 | Brenner et al. | |
| 6,148,017 A | 11/2000 | Borchert et al. | |
| 6,157,025 A | 12/2000 | Katagiri et al. | |
| 6,188,499 B1 | 2/2001 | Majima | |
| 6,222,861 B1 | 4/2001 | Kuo et al. | |
| 6,271,959 B1 | 8/2001 | Kim et al. | |
| 6,282,003 B1 | 8/2001 | Logan et al. | |
| 6,298,186 B1 | 10/2001 | He | |
| 6,331,991 B1 | 12/2001 | Mahgerefteh | |
| 6,351,585 B1 | 2/2002 | Amundson et al. | |
| 6,353,623 B1 | 3/2002 | Munks | |
| 6,359,716 B1 | 3/2002 | Taylor | |
| 6,421,151 B1 | 7/2002 | Berger | |
| 6,459,518 B1 | 10/2002 | Suzuki et al. | |
| 6,473,214 B1 | 10/2002 | Roberts et al. | |
| 6,486,440 B1 | 11/2002 | Crafts et al. | |
| 6,506,342 B1 | 1/2003 | Frankel | |
| 6,522,809 B1 | 2/2003 | Takabayashi et al. | |
| 6,563,623 B1 | 5/2003 | Penninckx et al. | |
| 6,577,013 B1 | 6/2003 | Glenn et al. | |
| 6,580,739 B1 | 6/2003 | Coldren | |
| 6,618,513 B2 | 9/2003 | Evankow, Jr. | |
| 6,628,690 B1 | 9/2003 | Fish et al. | |
| 6,650,667 B2 | 11/2003 | Nasu et al. | |
| 6,654,564 B1 | 11/2003 | Colbourne et al. | |
| 6,658,031 B2 | 12/2003 | Tuganov et al. | |
| 6,665,351 B2 | 12/2003 | Hedberg et al. | |
| 6,687,278 B1 | 2/2004 | Mason et al. | |
| 6,690,686 B2 | 2/2004 | Delfyett | |
| 6,738,398 B2 | 5/2004 | Hirata | |
| 6,748,133 B2 | 6/2004 | Liu et al. | |
| 6,778,307 B2 | 8/2004 | Clark | |
| 6,785,308 B2 | 8/2004 | Dyer et al. | |
| 6,807,215 B2 | 10/2004 | Lam et al. | |
| 6,810,047 B2 | 10/2004 | Oh et al. | |
| 6,815,786 B2 | 11/2004 | Ogasawara et al. | |
| 6,834,134 B2 | 12/2004 | Brennan et al. | |
| 6,836,487 B1 | 12/2004 | Farmer et al. | |
| 6,847,758 B1 | 1/2005 | Watanabe | |
| 6,943,951 B2 | 9/2005 | Kikuchi et al. | |
| 6,947,206 B2 | 9/2005 | Tsadka et al. | |
| 6,963,685 B2 | 11/2005 | Mahgerefteh et al. | |
| 7,013,090 B2 | 3/2006 | Adachi et al. | |
| 7,027,470 B2 | 4/2006 | May | |
| 7,054,538 B2 | 5/2006 | Mahgerefteh et al. | |
| 7,073,956 B1 | 7/2006 | Shin et al. | |
| 7,076,170 B2 | 7/2006 | Choa | |
| 7,123,846 B2 | 10/2006 | Tateyama et al. | |
| 7,164,865 B2 | 1/2007 | Tatsuno et al. | |
| 7,187,821 B2 | 3/2007 | Matsui et al. | |
| 7,263,291 B2 | 8/2007 | Mahgerefteh et al. | |
| 7,280,721 B2 | 10/2007 | McCallion et al. | |
| 7,352,968 B2 | 4/2008 | Tayebati | |
| 7,356,264 B2 | 4/2008 | Mahgerefteh et al. | |
| 7,376,352 B2 | 5/2008 | Tayebati | |
| 7,406,266 B2 | 7/2008 | Mahgerefteh et al. | |
| 7,406,267 B2 | 7/2008 | Johnson et al. | |
| 7,433,605 B2 | 10/2008 | Mahgerefteh et al. | |
| 7,474,858 B2 | 1/2009 | Lee et al. | |
| 7,474,859 B2 * | 1/2009 | Mahgerefteh et al. ........ 398/201 |
| 7,477,851 B2 | 1/2009 | Mahgerefteh et al. | |
| 7,480,464 B2 | 1/2009 | McCallion et al. | |
| 7,492,976 B2 | 2/2009 | Mahgerefteh et al. | |
| 7,502,532 B2 | 3/2009 | McCallion et al. | |
| 7,505,694 B2 | 3/2009 | Johnson et al. | |
| 7,515,626 B2 | 4/2009 | Lee et al. | |
| 7,536,113 B2 | 5/2009 | Matsui et al. | |
| 7,542,683 B2 | 6/2009 | Matsui et al. | |
| 7,555,225 B2 | 6/2009 | Mahgerefteh et al. | |
| 7,558,488 B2 | 7/2009 | Matsui et al. | |
| 7,564,889 B2 | 7/2009 | Matsui et al. | |
| 7,609,977 B2 | 10/2009 | Matsui et al. | |
| 7,613,401 B2 | 11/2009 | Matsui et al. | |
| 7,616,902 B2 | 11/2009 | Mahgerefteh et al. | |
| 7,630,425 B2 | 12/2009 | Tayebati et al. | |
| 7,639,955 B2 | 12/2009 | Zheng et al. | |
| 7,657,179 B2 | 2/2010 | Mahgerefteh et al. | |
| 7,663,762 B2 | 2/2010 | Mahgerefteh et al. | |
| 7,697,186 B2 | 4/2010 | McCallion et al. | |
| 7,697,847 B2 | 4/2010 | Matsui et al. | |
| 7,742,542 B2 | 6/2010 | Mahgerefteh et al. | |
| 7,760,777 B2 | 7/2010 | Matsui et al. | |
| 7,778,295 B2 | 8/2010 | Matsui et al. | |
| 7,809,280 B2 | 10/2010 | Mahgerefteh et al. | |
| 7,860,404 B2 | 12/2010 | Matsui et al. | |
| 2001/0012430 A1 | 8/2001 | Usami et al. | |
| 2001/0048705 A1 | 12/2001 | Kitaoka et al. | |
| 2002/0012369 A1 | 1/2002 | Nasu et al. | |
| 2002/0044738 A1 | 4/2002 | Jablonski | |
| 2002/0048290 A1 | 4/2002 | Tanaka et al. | |
| 2002/0063930 A1 | 5/2002 | Blauvelt | |
| 2002/0131047 A1 | 9/2002 | Zarrabian et al. | |
| 2002/0154372 A1 | 10/2002 | Chung et al. | |
| 2002/0159490 A1 | 10/2002 | Karwacki | |
| 2002/0176659 A1 | 11/2002 | Lei et al. | |
| 2003/0002099 A1 | 1/2003 | Sayyah et al. | |
| 2003/0002120 A1 | 1/2003 | Choa | |
| 2003/0063647 A1 | 4/2003 | Yoshida et al. | |
| 2003/0067952 A1 | 4/2003 | Tsukiji et al. | |
| 2003/0077031 A1 | 4/2003 | Zhang et al. | |
| 2003/0099018 A1 | 5/2003 | Singh et al. | |
| 2003/0147114 A1 | 8/2003 | Kang et al. | |
| 2003/0161370 A1 | 8/2003 | Buimovich et al. | |
| 2003/0169787 A1 | 9/2003 | Vurgaftman et al. | |
| 2003/0193974 A1 | 10/2003 | Frankel et al. | |
| 2003/0210912 A1 | 11/2003 | Leuthold | |
| 2004/0008933 A1 | 1/2004 | Mahgerefteh et al. | |
| 2004/0008937 A1 | 1/2004 | Mahgerefteh et al. | |
| 2004/0036943 A1 | 2/2004 | Freund et al. | |
| 2004/0076199 A1 | 4/2004 | Wipiejewski et al. | |
| 2004/0081386 A1 | 4/2004 | Morse et al. | |
| 2004/0086012 A1 | 5/2004 | Kitaoka et al. | |
| 2004/0096221 A1 | 5/2004 | Mahgerefteh et al. | |
| 2004/0218890 A1 | 11/2004 | Mahgerefteh et al. | |
| 2004/0234200 A1 | 11/2004 | Jennings et al. | |
| 2005/0100345 A1 | 5/2005 | Welch et al. | |
| 2005/0111852 A1 | 5/2005 | Mahgerefteh et al. | |

| | | | |
|---|---|---|---|
| 2005/0152702 | A1 | 7/2005 | Mahgerefteh et al. |
| 2005/0163512 | A1 | 7/2005 | Tayebati et al. |
| 2005/0169638 | A1 | 8/2005 | Tayebati et al. |
| 2005/0169642 | A1 | 8/2005 | Mahgerefteh et al. |
| 2005/0175356 | A1 | 8/2005 | McCallion et al. |
| 2005/0196177 | A1 | 9/2005 | Moran |
| 2005/0206989 | A1 | 9/2005 | Marsh |
| 2005/0213993 | A1 | 9/2005 | Kazemi-Nia et al. |
| 2005/0249509 | A1 | 11/2005 | Nagarajan et al. |
| 2005/0271394 | A1 | 12/2005 | Whiteaway et al. |
| 2005/0286829 | A1* | 12/2005 | Mahgerefteh et al. .......... 385/27 |
| 2005/0286909 | A1 | 12/2005 | Kish et al. |
| 2006/0002718 | A1 | 1/2006 | Matsui et al. |
| 2006/0008272 | A1 | 1/2006 | Abeles et al. |
| 2006/0018666 | A1 | 1/2006 | Matsui et al. |
| 2006/0029358 | A1* | 2/2006 | Mahgerefteh et al. .......... 386/33 |
| 2006/0029396 | A1 | 2/2006 | Mahgerefteh et al. |
| 2006/0029397 | A1* | 2/2006 | Mahgerefteh et al. ........ 398/187 |
| 2006/0078338 | A1 | 4/2006 | Johnson et al. |
| 2006/0120416 | A1 | 6/2006 | Hu et al. |
| 2006/0193636 | A1 | 8/2006 | Katagiri et al. |
| 2006/0228120 | A9 | 10/2006 | McCallion et al. |
| 2006/0233556 | A1 | 10/2006 | Mahgerefteh et al. |
| 2006/0239306 | A1 | 10/2006 | Donanhoe |
| 2006/0274993 | A1 | 12/2006 | Mahgerefteh et al. |
| 2007/0286608 | A1 | 12/2007 | Matsui et al. |
| 2008/0002990 | A1 | 1/2008 | McCallion et al. |
| 2008/0037608 | A1 | 2/2008 | Zhou et al. |
| 2008/0159747 | A1 | 7/2008 | Mahgerefteh et al. |
| 2008/0166134 | A1 | 7/2008 | McCallion et al. |
| 2008/0181619 | A1 | 7/2008 | Heismann |
| 2008/0187325 | A1 | 8/2008 | McCallion et al. |
| 2008/0193132 | A1 | 8/2008 | Matsui et al. |
| 2008/0193144 | A1 | 8/2008 | Zhou et al. |
| 2008/0240180 | A1 | 10/2008 | Matsui et al. |
| 2008/0247765 | A1 | 10/2008 | Mahgerefteh et al. |
| 2008/0291950 | A1 | 11/2008 | McCallion et al. |
| 2009/0003842 | A1 | 1/2009 | Mahgerefteh et al. |
| 2009/0060526 | A1 | 3/2009 | Matsui et al. |
| 2009/0080905 | A1 | 3/2009 | Olsson |
| 2009/0196631 | A1 | 8/2009 | Daghighian et al. |
| 2009/0238224 | A1 | 9/2009 | Ye |
| 2009/0269069 | A1 | 10/2009 | Mahgerefteh et al. |
| 2010/0008679 | A1 | 1/2010 | Cole |
| 2010/0098436 | A1 | 4/2010 | Mahgerefteh et al. |
| 2010/0279447 | A1 | 11/2010 | Matsui et al. |
| 2010/0311195 | A1 | 12/2010 | Matsui et al. |

FOREIGN PATENT DOCUMENTS

| | | |
|---|---|---|
| EP | 0524758 | 7/1992 |
| EP | 602659 | 6/1994 |
| GB | 2 107 147 | 4/1983 |
| JP | 58-075340 | 5/1983 |
| JP | 62-189832 | 8/1987 |
| JP | 09-214427 | 8/1997 |
| JP | 11-031859 | 2/1999 |
| JP | 2000105313 | 4/2000 |
| JP | 2001-036477 | 2/2001 |
| JP | 2001-284711 | 10/2001 |
| JP | 2001291928 | 10/2001 |
| JP | 2001320328 | 11/2001 |
| JP | 2002243935 | 8/2002 |
| JP | 2002267834 | 9/2002 |
| JP | 2002267998 | 9/2002 |
| JP | 2002-311235 | 10/2002 |
| WO | 9905804 | 2/1999 |
| WO | 0104999 | 1/2001 |
| WO | WO 0117076 | 3/2001 |
| WO | WO 0118919 | 3/2001 |
| WO | 03005512 | 1/2003 |

OTHER PUBLICATIONS

Binder, J. et al., 10 Gbit/s-Dispersion Optimized Transmission at 1.55 um Wavelength on Standard Single Mode Fiber, IEEE Photonics Technology Letters, Apr. 1994, 558-560, vol. 6, No. 4.

Hyryniewicz, J.V., et al., Higher Order Filter Response in Coupled Microring Resonators, IEEE Photonics Technology Letters, Mar. 2000, 320-322, vol. 12, No. 3.

Koch, T. L. et al., Nature of Wavelength Chirping in Directly Modulated Semiconductor Lasers, Electronics Letters, Dec. 6, 1984, 1038-1039, vol. 20, No. 25/26.

Kurtzke, C., et al., Impact of Residual Amplitude Modulation on the Performance of Dispersion-Supported and Dispersion-Mediated Nonlinearity-Enhanced Transmission, Electronics Letters, Jun. 9, 1994, 988, vol. 30, No. 12.

Li, Yuan P., et al., Chapter 8: Silicon Optical Bench Waveguide Technology, Optical Fiber Communications, 1997, 319-370, vol. 111B, Lucent Technologies, New York.

Little, Brent E., Advances in Microring Resonators, Integrated Photonics Research Conference 2003.

Mohrdiek, S. et al., 10-Gb/s Standard Fiber Transmission Using Directly Modulated.1.55-um Quantum-Well DFB Lasers, IEEE Photonics Technology Letters, Nov. 1995, 1357-1359, vol. 7, No. 11.

Morton, P.A. et al., "38.5km error free transmission at 10Gbit/s in standard fibre using a low chirp, spectrally filtered, directly modulated 1.55um DFB laser", Electronics Letters, Feb. 13, 1997, vol. 33(4).

Prokais, John G., Digital Communications, 2001, 202-207, Fourth Edition, McGraw Hill, New York.

Rasmussen, C.J., et al., Optimum Amplitude and Frequency-Modulation in an Optical Communication System Based on Dispersion Supported Transmission, Electronics Letters, Apr. 27, 1995, 746, vol. 31, No. 9.

Shalom, Hamutali et al., On the Various Time Constants of Wavelength Changes of a DFB Laser Under Direct Modulation, IEEE Journal of Quantum Electronics, Oct. 1998, pp. 1816-1822, vol. 34, No. 10.

Wedding, B., Analysis of fibre transfer function and determination of receiver frequency response for dispersion supported transmission, Electronics Letters, Jan. 6, 1994, 58-59, vol. 30, No. 1.

Wedding, B., et al., 10-Gb/s Optical Transmission up to 253 km Via Standard Single-Mode Fiber Using the Method of Dispersion-Supported Transmission, Journal of Lightwave Technology, Oct. 1994, 1720, vol. 12, No. 10.

Yu, et al., Optimization of the Frequency Response of a Semiconductor Optical Amplifier Wavelength Converter Using a Fiber Bragg Grating, Journal of Lightwave Technology, Feb. 1999, 308-315, vol. 17, No. 2.

Corvini, P.J. et al., Computer Simulation of High-Bit-Rate Optical Fiber Transmission Using Single-Frequency Lasers, Journal of Lightwave Technology, Nov. 1987, 1591-1596, vol. LT-5, No. 11.

Lee, Chang-Hee et al., Transmission of Directly Modulated 2.5-Gb/s Signals Over 250-km of Nondispersion-Shifted Fiber by Using a Spectral Filtering Method, IEEE Photonics Technology Letters, Dec. 1996, 1725-1727, vol. 8, No. 12.

Matsui, Yasuhiro et al, Chirp-Managed Directly Modulated Laser (CML), IEEE Photonics Technology Letters, Jan. 15, 2006, pp. 385-387, vol. 18, No. 2.

Nakahara, K. et al, 40-Gb/s Direct Modulation With High Extinction Ratio Operation of 1.3-µm InGaAl As Multiquantum Well Ridge Waveguide Distributed Feedback Lasers, IEEE Photonics Technology Leters, Oct. 1, 2007, pp. 1436-1438, vol. 19 No. 19.

Sato, K. et al, Chirp Characteristics of 40-Gb/s Directly Modulated Distributed-Feedback Laser Diodes, Journal of Lightwave Technology, Nov. 2005, pp. 3790-3797, vol. 23, No. 11.

Mahgerefteh et al., Chirp managed laser (CML): A compact transmitter for dispersion tolerant 10 Gb/s networking applications; Optical Fiber Communication Conference, 2006 and the 2006 National Fiber Optic Engineers Conference. OFC 2006, Mar. 5-10, 2006; Digital Object Identifier: 10.1109/OFC.2006.215459.

Wesstrom et al., State-of-the-art performance of widely tunable modulated grating Y-branch lasers; Optical Fiber Communication Conference, 2004. OFC 2004, vol. 1, no., pp. 2 vol. (1800), Feb. 23-27, 2004; doi: 10.1109/OFC.2004.1349295.

U.S. Appl. No. 12/017,957, mail date Nov. 5, 2010, Office Action.
U.S. Appl. No. 12/025,573, mail date Oct. 6, 2010, Office Action.
U.S. Appl. No. 12/028,675, mail date Oct. 27, 2010, Office Action.
U.S. Appl. No. 12/028,678, mail date Dec. 8, 2010, Office Action.
U.S. Appl. No. 12/047,017, mail date Sep. 27, 2010, Notice of Allowance.
U.S. Appl. No. 12/053,344, mail date Apr. 1, 2010, Office Action.

U.S. Appl. No. 12/115,337, mail date Oct. 28, 2010, Notice of Allowance.
U.S. Appl. No. 12/184,137, mail date Dec. 2, 2010, Notice of Allowance.
JP 2009-504345, mail date Oct. 26, 2010, Office Action.
EP 05764209.2, publication date Jun. 9, 2009, Exam Report.
CN 200580037807, publication date May 27, 2010, Office Action.
CN 200580012705.4, publication date Mar. 29, 2010, Office Action.
CN 200580015245.0, publication date Sep. 25, 2009, Office Action.
CN 200580015245.0, publication date Mar. 29, 2010, Office Action.
CN 200880009551.7, publication date Jul. 14, 2010, Office Action.
EP 05731268.8, publication date Jan. 16, 2008, Office Action.
EP 05731268.8, publication date May 12, 2010, Office Action.
KR 102008-7027139, publication date Apr. 28, 2010, Office Action.
JP 2009-504345, publication date Apr. 27, 2010, Office Action.
JP2004-551835, publication date Jul. 18, 2008, Office Action.
JP2004-551835, publication date Mar. 2, 2010, Office Action.
CN 200380108289.9, publication date Nov. 23, 2007, Office Action.
CN 200380108289.9, publication date Aug. 29, 2008, Office Action.
CN 200380108289.9, publication date Nov. 21, 2008, Office Action.
CA 2510352, publication date Mar. 17, 2010, Office Action.
Dischler, Roman, Buchali, Fred, Experimental Assessment of a Direct Detection Optical OFDM System Targeting 10Gb/s and Beyond, Optical Fiber Communication/National Fiber Optic Engineers Conference, Feb. 24-28, 3 pages, San Diego, CA, 2008.
Dong Jae Shin, et al., Low-cost WDM-PON with Colorless Bidirectional Tranceivers, Journal of Lightwave Technology, Jan. 2006, pp. 158-165, vol. 24, No. 1.
Kikuchi, Nobuhiko, et al., Experimental Demonstration of Incoherent Optical Multilevel Staggered-APSK (Amplitude- and Phase-Shift Keying) Signaling, Optical Fiber Communication/National Fiber Optic Engineers Conference, Feb. 24-28, 2008, 3 pages, San Diego, CA.
Kiyoshi Fukuchi, Proposal and Feasibility Study of a 6-level PSK modulation format based system for 100 Gg/s migration, 2007, 3 pages.
Lammert et al., MQW DBR Lasers with Monolithically Integrated External-Cavity Electroabsorption Modulators Fabricated Without Modification of the Active Region, IEEE Photonics Technology Letters, vol. 9, No. 5, May 1997, pp. 566-568.
Mahgerefteh, D. and Fan, F., Chirp-managed-laser technology delivers > 250-km reach, Lightwave Online, 2005, PennWell Corporation. Accessed online Jul. 1, 2009 at: http://www.finisar.com/download_31wMeaCML_Application%20White%20Paper-LW.pdf.
Ronald Freund, Dirk Daniel Gross, Matthias Seimetz, Lutz Molle, Christoph Casper, 30 Gbit/s RZ 8-PSK Transmission over 2800 km Standard Single Mode Fibre without Inline Dispersion Compensation, 2007, 3 pages.
Tokle, Torger et al., Advanced Modulation Formats for Transmission Systems, Optical Fiber Communication/National Fiber Optic Engineers Conference, Feb. 24-28, 2008, 3 pages, San Diego, CA.
Sekine, Kenro, et al., Advanced Multi-level Transmission Systems, Optical Fiber Communication/National Fiber Optic Engineers Conference, Feb. 24-28, 2008, 3 pages, San Diego, CA.
U.S. Appl. No. 11/964,315, mail date Aug. 25, 2010, Office Action.
U.S. Appl. No. 11/964,321, mail date Aug. 25, 2010, Office Action.
U.S. Appl. No. 12/115,337, mail date Mar. 4, 2010, Office Action.
U.S. Appl. No. 12/115,337, mail date Aug. 20, 2010, Office Action.
U.S. Appl. No. 12/047,017, mail date Jun. 1, 2010, Restriction Requirement.
U.S. Appl. No. 12/047,017, mail date Aug. 6, 2010, Office Action.
U.S. Appl. No. 12/053,344, mail date Sep. 3, 2010, Notice of Allowance.
Non-final Office Action mailed Apr. 7, 2011 in connection with U.S. Appl. No. 12/126,717.
Jung, Sungyong et al., "CMOS Multi-level Signal Transmitter for Optical Communication," the 47th IEEE International Midwest Symposium on Circuits and Systems 2004, pp. 185-188.

* cited by examiner

CHIRPED LASER WITH PASSIVE FILTER ELEMENT FOR DIFFERENTIAL PHASE SHIFT KEYING GENERATION

CROSS-REFERENCE TO RELATED APPLICATIONS

This application is a continuation-in-part of PCT Application Serial No. PCT/US2007/008729 filed Apr. 6, 2007.

BACKGROUND OF THE INVENTION

1. The Field of the Invention

In differential phase shift keying (DPSK) format, an input digital electrical signal representing 1s and 0s is converted to an optical signal in which the information is encoded in the phase of a continuous wave (CW), constant amplitude signal. The modulation rule is that given an input random digital sequence of 1s and 0 bits, the phase of the CW signal is changed by $\pi$ for every occurrence of a 0 bit while the phase is unchanged for occurrence of a 1 bit.

The advantage of this scheme is that every bit carries energy, in contrast with non-return to zero on-off keying (OOK), where the 1s have energy while the 0s have no energy. The advantage is realized by using a 1 bit delayed interferometer at the receiver together with a balanced receiver. The function of the 1 bit delayed interferometer is to convert the phase modulation to amplitude modulation. This interferometer has two outputs, 1) the sum of each bit with a one bit delayed bit, 2) the difference of each bit with a one bit delayed bit. Since the input DPSK signal is split between the two arms of the interferometer, the power in each arm is reduced by a factor of 2.

The decision threshold is placed at 0 volts, so that the "distance" between the 1 and 0 bits is now 2; hence the 3 dB advantage. For a RZ-DPSK transmitter, the output of a CW laser is preferably modulated by a clock with a 30%-50% duty cycle or at the bit rate in order to further improve the sensitivity at the receiver. The output intensity is therefore a pulse train with 30-50% duty cycle at the bit rate, while the phases of the pulses follow the DPSK rule above.

Prior art RZ-DPSK transmitters are complicated and expensive, requiring multiple modulators that include multiple optical components that must be precisely manufactured and calibrated. A typical RZ-DPSK transmitter includes a CW laser, a first modulator to encode DPSK data onto the laser output, and a second modulator to impose a clock intensity modulation on the output. The modulators used in prior art are typically two LiNbO$_3$ Mach-Zehnder interferometers which are bulky and require a high power consumption drivers. They are therefore not appropriate for small form factor transponders.

In view of the foregoing, it would be an advancement in the art to provide a transmitter that is compact, inexpensive to manufacture, and requires a low power consumption driver.

BRIEF SUMMARY OF THE INVENTION

In one aspect of the invention digital input data is transmitted by encoding the data in an optical signal generated by a frequency modulated source such as an adiabatically chirped laser. The optical signal may be a waveform having a series of signal pulse pairs, each signal pulse pair having a phase modulated portion followed in time by a carrier portion or fixed phase portion. The phase modulated portions have one of a discrete number of frequency levels corresponding to at least one data symbol. The varying frequency of the phase modulated portions results in the fixed phase pulse portions having a phase that differs from the immediately preceding fixed phase pulse portion according to the frequency difference of the levels. The fixed phase pulse portions preferably have the same carrier frequency. The optical signal is transmitted through an optical filter that attenuates at least some of the phase modulated portions more than the fixed phase pulse portions. The resulting signal waveform is then transmitted to a receiver. The receiver preferably includes a phase detector, such as a one bit delayed Mach-Zehnder interferometer that demodulates the optical signal in order to detect the phase of the fixed phase pulses.

In another aspect of the invention, each fixed phase portion has a phase differing from the immediately preceding fixed phase portion by $\pi$ or $2\pi$ (i.e. 0 phase difference) in order to encode two data symbols such as a 1 and 0. This represents a differential phase shift keying (DPSK) signal.

In another aspect of the invention, each phase modulated portion has one of N frequency shifts relative to the carrier frequency, resulting in fixed phase portions having one of N phase differences relative to a preceding fixed phase portions in order to generate a differential N-level phase shift keying (DNPDK) signal. In such embodiments, each fixed phase portion encodes a unique data sequence of $\log_2 N$ bits. For example, four frequency levels may be used to generate phases of $2\pi$, $\pi/2$, $\pi$, and $3\pi/2$, resulting in a differential quadrature phase shift keying (DQPSK) signal. In another embodiment, eight frequency levels are used to generate phases such as $\pi/4$, $\pi 2$, $3\pi/4$, $\pi$, $5\pi/4$, $3\pi/2$, $7\pi/4$, and $2\pi$. This represents differential 8 PSK (D-8PSK). All phase values are modulo $2\pi$, i.e. they may be independently adjusted by $\pm 2n\pi$, where n is an integer number.

In another aspect of the invention, the N frequency shifts are chosen to reduce the required frequency excursion relative to the carrier frequency. In some embodiments, one of the N frequency shifts may be chosen to be equal to zero frequency, leading to a 0 phase shift. The N frequency shifts may be either positive or negative relative to the carrier frequency. The N frequency shifts may also be symmetrically distributed about the carrier frequency such that the phase of the fixed phase portions are equal to 0, $\pi/4$, $\pi/2$, $3\pi/4$, $\pi$, $-3\pi/4$, and $-\pi/2$, $-\pi/4$.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
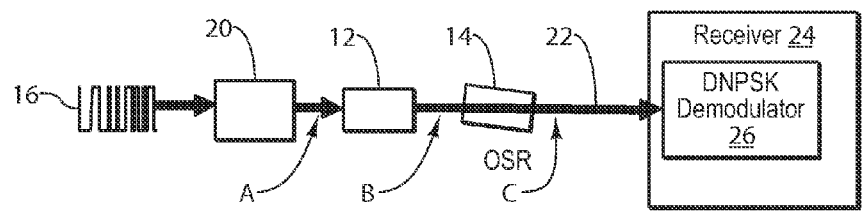
FIG. 1 illustrates a transmitter for generating a DNPSK signal in accordance with an embodiment of the present invention.

The quality and performance of a digital fiber optic transmitter is determined by the distance over which the transmitted digital signal can propagate without severe distortions. The bit error rate (BER) of the signal is measured at a receiver after propagation through dispersive fiber and the optical power required to obtain a certain BER, typically $10^{-12}$, called the sensitivity, is determined. The difference in sensitivity at the output of the transmitter with the sensitivity after propagation is called dispersion penalty. This is typically characterized the distance over which a dispersion penalty reaches a level of ~1 dB. A standard 10 Gb/s optical digital transmitter, such as an externally modulated source can transmit up to a distance of ~50 km in standard single mode fiber at 1550 nm before the dispersion penalty reaches the level of ~1 dB, called the dispersion limit. The dispersion limit is determined by the fundamental assumption that the digital signal is transform limited, i.e. the signal has no time varying phase across its bits and has a bit period of 100 ps, or 1/(bit rate). Another measure of the quality of a transmitter is the absolute sensitivity after fiber propagation.

Three types of optical transmitters are presently in use in prior art fiber optic systems: (i) directly modulated laser (DML), (ii) Electroabsorption Modulated Laser (EML), and (iii) Externally Modulated Mach-Zhender (MZ). For transmission in standard single mode fiber at 10 Gb/s, and 1550 nm, it has generally been assumed that MZ modulators and EMLs can have the longest reach, typically reaching 80 km. Using a special coding scheme, referred to as phase shaped binary transmission (duobinary), MZ transmitters can reach 200 km. On the other hand, directly modulated lasers (DML) reach <5 km because their inherent time dependent chirp causes severe distortion of the signal after this distance.

By way of example, various systems for long-reach lightwave data transmission (>80 km at 10 Gb/s) through optical fibers which increase the reach of DMLs to >80 km at 10 Gb/s in single mode fiber are disclosed in (i) U.S. patent application Ser. No. 10/289,944, filed Nov. 6, 2002 by Daniel Mahgerefteh et al. for POWER SOURCE FOR A DISPERSION COMPENSATION FIBER OPTIC SYSTEM; (ii) U.S. patent application Ser. No. 10/680,607, filed Oct. 6, 2003 by Daniel Mahgerefteh et al. for FLAT DISPERSION FREQUENCY DISCRIMINATOR (FDFD); and (iii) U.S. patent application Ser. No. 10/308,522, filed Dec. 3, 2002 by Daniel Mahgerefteh et al. for HIGH-SPEED TRANSMISSION SYSTEM COMPRISING A COUPLED MULTI-CAVITY OPTICAL DISCRIMINATOR; which patent applications are hereby incorporated herein by reference.

In such systems, a Frequency Modulated (FM) source is followed by an Optical Spectrum Reshaper (OSR) which uses the frequency modulation to increase the amplitude modulated signal and to increase the dispersion tolerance of the resulting signal by introducing phase correlations between the bits, resulting in destructive inter-symbol interference between bits after fiber propagation. Such transmitters include the Chirp Managed Laser (CML)™. In some transmitters, the frequency modulated source includes a directly modulated laser (DML). The Optical Spectrum Reshaper (OSR), sometimes referred to as a frequency discriminator, can be formed by an appropriate optical element that has a wavelength-dependent transmission function. The OSR can be adapted to convert frequency modulation to amplitude modulation as well as to convert amplitude modulation to frequency modulation.

In some embodiments of the present invention, the chirp properties of the frequency modulated source are separately adapted and then further reshaped by configuring the OSR to further extend the reach of the transmitter to over 250 km on standard single mode fiber at 10 Gb/s and 1550 nm.

The novel system of the present invention combines, among other things, selected features of systems described in (i) U.S. Provisional Patent Application Ser. No. 60/548,230, filed Feb. 27, 2004 by Yasuhiro Matsui et al. for entitled OPTICAL SYSTEM COMPRISING AN FM SOURCE AND A SPECTRAL RESHAPING ELEMENT; (ii) U.S. Provisional Patent Application Ser. No. 60/554,243, filed Mar. 18, 2004 by Daniel Mahgerefteh et al. for FLAT CHIRP INDUCED BY FILTER EDGE; (iv) U.S. Provisional Patent Application Ser. No. 60/566,060, filed Apr. 28, 2004 by Daniel Mahgerefteh et al. for, A METHOD OF TRANSMISSION USING PARTIAL FM AND AM MODULATION; (iv) U.S. Provisional Patent Application Ser. No. 60/657,737, filed May 3, 2004 by Daniel Mahgerefteh et al. for ADIABATIC FREQUENCY MODULATION (AFM); (v) U.S. Provisional Patent Application Ser. No. 60/569,769, filed May 10, 2004 by Daniel Mahgerefteh et al. for FLAT CHIRP INDUCED BY AN OPTICAL FILTER EDGE; (vi) U.S. patent application Ser. No. 11/068,032, filed Feb. 28, 2005 by Daniel Mahgerefteh et al. for OPTICAL SYSTEM COMPRISING AN FM SOURCE AND A SPECTRAL RESHAPING ELEMENT; (vii) U.S. patent application Ser. No. 11/084,633, filed Mar. 18, 2005 by Daniel Mahgerefteh et al. for METHOD AND APPARATUS FOR TRANSMITTING A SIGNAL USING SIMULTANEOUS FM AND AM MODULATION; (viii) U.S. patent application Ser. No. 11/084,630, filed Mar. 18, 2005 by Daniel Mahgerefteh et al. for FLAT-TOPPED CHIRP INDUCED BY OPTICAL FILTER EDGE; and (ix) U.S. patent application Ser. No. 11/051,893, filed Feb. 4, 2005 by Yasuhiro Matsui et al. for ADIABATICALLY FREQUENCY MODULATED SOURCE, which Patent Applications are hereby incorporated herein by reference.

The present invention describes a device for generation of an optical differentially phase shift keyed (DNPSK) return to zero (RZ) signal using a transmitter, such as those described in above referenced Patent Applications, operated according to a novel method disclosed herein.

Referring to FIG. 1, a transmitter 10 includes an FM source 12, such as a directly modulated laser, and an optical spectrum reshaper (OSR) 14, used to generate a DPSK signal, such as an RZ-DPSK signal, without the use of external modulators. The OSR 14 may include a multi-cavity etalon filter, a single or multi-cavity ring resonator filter, an arrayed waveguide grating (AWG) filter, and fiber Bragg grating filter.

A binary electrical digital data stream 16 is fed into a digital multi-level transformer (DMT) 20, which converts the two level input to, for example a three level output according to the procedure described below. Alternatively, the DMT 20 may be programmed to process multi-bit sequences, such that the multilevel DMT 20 outputs more than two levels each corresponding to a unique bit sequence.

The three, or more, level digital signal from the DMT 20 is used to drive the FM source 12 which converts the input digital 3 level signal to a multi-level optical signal with both frequency and intensity modulation. The output of the FM source 12 is then transmitted through the OSR 14 and into an optical fiber 22 coupled to a receiver 24. The receiver 24 includes a DNPSK demodulator 26 capable of detecting phase differences in a series of pulses transmitted to the receiver 24 in order to reconstruct the digital data stream 16.

The amplitude of the electrical signal is chosen to generate a particular frequency excursion and amplitude excursion by the laser 12 corresponding to the amplitude of the input digital signal. The optical output of the FM source 12 is passed through the OSR 14, which may have two functions: 1) to increase the amplitude modulation of the input signal. 2) to convert the input adiabatic frequency excursion to a flat topped chirp with nearly instantaneous abrupt phase shifts near the null outputs of the signal, as described in U.S. patent application Ser. No. 11/084,630, filed Mar. 18, 2005, which is incorporated herein by reference.

Figure 2:
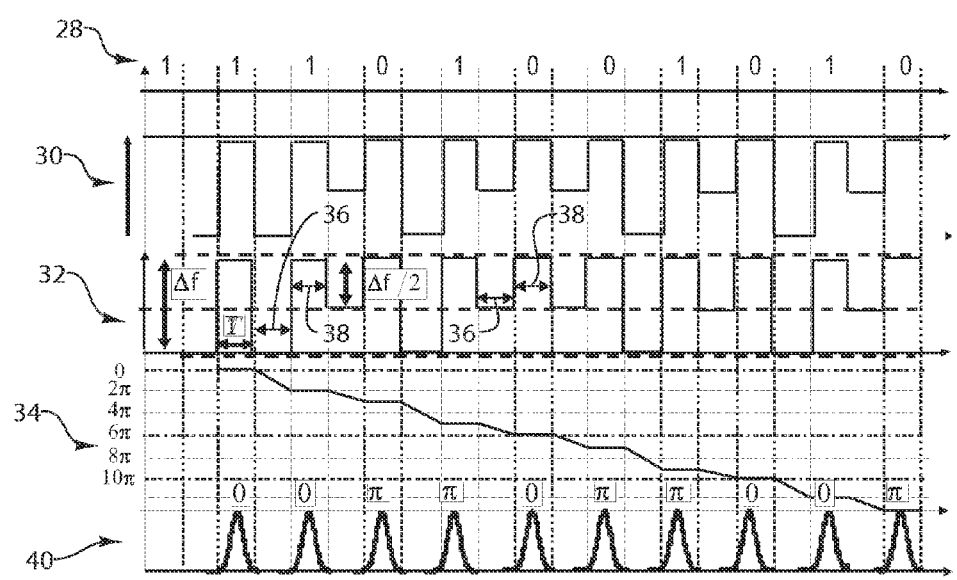
FIG. 2 is a timing diagram illustrating signal levels at points within a transmitter used to generate a DPSK signal in accordance with an embodiment of the present invention.

To further elucidate this description, consider the input binary digital bit sequence $a_n$ = ... 1 1 1 0 1 0 0 1 0 1 0 0 0 1 1 0 1 0 1 1 0 1 1. FIG. 2 shows the bit sequence 28, and pulse shapes at various points in the transmitter chain labeled A, B, and C. The data sequence is input to the DMT 20, which generates, at point A, the signal 30 of FIG. 2 having the pulse shapes shown. The output of the DMT 20 drives the FM source 12, which generates an optical signal having the illustrated frequency profile 32 and phase progression 34 at point B. The frequency profile 32 includes pulses each including both a phase modulated portion 36 and a fixed phase portion 38. For purpose of this disclosure "fixed phase" signifies that that fixed phase portion 38 has a substantially constant frequency about equal to a carrier frequency across its duration and therefore does not experience a phase shift to the same degree as the phase modulated portion 36, enabling the phase shift across the phase modulated portions to substantially define the phase difference between contiguous fixed phase portions However, in some embodiments, the fixed phase portion 38 has a non-ideal pulse shape such that some phase variation occurs. In some embodiments, the phase difference across the fixed phase portion is less than $\lambda/8$, preferably less than $\lambda/16$, and more preferably less than $\lambda/32$. The phase modulated portion 36 has a frequency chosen to modulate the phase of the immediately following fixed phase portion 38 relative to the fixed phase portion of an immediately preceding fixed phase pulse in order to encode information in the phase of the fixed phase portion 38. The fixed phase portion 38 may have a 50% duty cycle, however other duty cycles such as from 30% to 50% or from 50% to 60% may be used.

The phase modulated portions 36 and fixed phase pulse portions 38 are produced by the FM source 12 in response to the signal 30 which is generated by the DMT 20 according to the following rules. When a bit is equal to the previous bit, $b_n = b_{n-1}$, the signal 30 at point A drops to 0 (changes by V), stays at the 0 value for a time T, preferably equal to 50% of the bit duration to generate the phase modulated portion 36. The signal 30 then returns to the value V for the remainder of the duration of the bit to generate the fixed phase portion 38 for that bit. Thus, when the bit is equal to the preceding bit, $b_n = b_{n-1}$, the frequency profile 32 of the laser output at point B drops from a peak frequency $f_0$ to a low frequency $f_2$ for a time T, and returns to the peak frequency $f_0$ for the remainder of the bit duration.

When a bit is different from the previous bit, $b_n \neq b_{n-1}$, the phase signal 30 drops to V/2 and stays at that value for a time period equal to T to generate the phase modulated portion 36. The signal 30 then returns to the value V for the remainder of the bit duration to generate the fixed-phase portion 38 for that bit. Thus, when the bit is different from the last value, $b_n \neq b_{n-1}$, the frequency profile 32 of the laser output at point B drops from a peak frequency $f_0$ to an intermediate frequency $f_1$ for a time period equal to T, and returns to the peak frequency $f_0$ for the remainder of the bit duration.

This choice of voltage output guarantees the generation of the proper phase relation between bits at the output of a frequency modulated source, as described below. The FM source 12, such as a DFB laser, is driven by the voltage pattern at point A, and generates a frequency and amplitude modulated output waveform at point B having the illustrated frequency profile 32 and phase progression 34. The value of the drive voltage, V, may be chosen to generate a frequency excursion which is equal to the bit rate of the digital signal, e.g. 10 GHz for a 10 Gb/s data stream with 50% duty cycle. More generally, the full frequency excursion, $\Delta f$ is chosen such that $\Delta f \times T = 1$, where T is the duration of the 0 value and is equal to ½ the bit period for a 50% duty cycle pulse.

The voltage is determined by the so called FM efficiency of the source, $\eta_{FM}$, in GHz/V; in other words: $\Delta f = \eta_{FM} V$. The phase of the optical signal at the output of the DFB is the time integral of the frequency excursion as shown in FIG. 2. For example for a 10 Gb/s return-to-zero (RZ) data with 50% duty cycle, the phase of the frequency modulated signal slips by 10 GHz×2π×50 ps=2π, when the full frequency excursion $\Delta f$=10 GHz is applied.

When the adjacent bits are different, the DMT 20 produces ½ the voltage; generating 5 GHz frequency excursion for the case of 10 Gb/s RZ. In this case the phase of the signal slips by 10 GHz×2π×50 ps=π, and the resulting adjacent pulses will have a π phase shift between them. The output of the FM source is passed through the OSR 14 which increases the amplitude excursion and flattens the chirp, as shown by the output pulses 40 at point C in the transmitter train. The OSR 14 may have the functionality described in the Patent Applications incorporated herein by reference. As shown in FIG. 2 the intensity at point C is an RZ-DPSK signal wherein each bit carries equal energy and the data is encoded in the phase of the bits.

The amplitude of the resulting pulses at the output of the FM source 12 is not shown, but typically follows the frequency excursion. If the source has independent control for amplitude and frequency excursion, then the amplitude can be adjusted separately to generate an RZ pulse shape. In this case the amplitude modulation may require a separate electrical signal, which is programmed to provide the desired amplitude modulation after the OSR 14. For example, the amplitude modulation is reduced for bits having large frequency excursion and increased for bits having small frequency modulation such that the output amplitude of high level and low levels after OSR 14 are about the same. The output amplitude after the OSR preferably approximately satisfies the following equation:

$$AM(t) + FM(t) \times (OSR\ slope) = constant \qquad (2)$$

wherein AM is amplitude modulation depth in dB, which is defined as the ratio of the 1 level to the 0 level, FM is the frequency modulation in GHz, slope is slope of the OSR 14 in dB/GHz. In the example above, if the FM source 12 has independent control of output amplitude, the AM component would be programmed to output voltage $V_{AM}$ when the frequency is at half the maximum, i.e. $\Delta f/2$ and the amplitude is set to $V_{AM}/2$ when the frequency excursion is at maximum, i.e. $\Delta f$. Here $V_{AM}$ is chosen to provide the appropriate amplitude response, and depends on the AM slope efficiency of the source.

Figure 3:
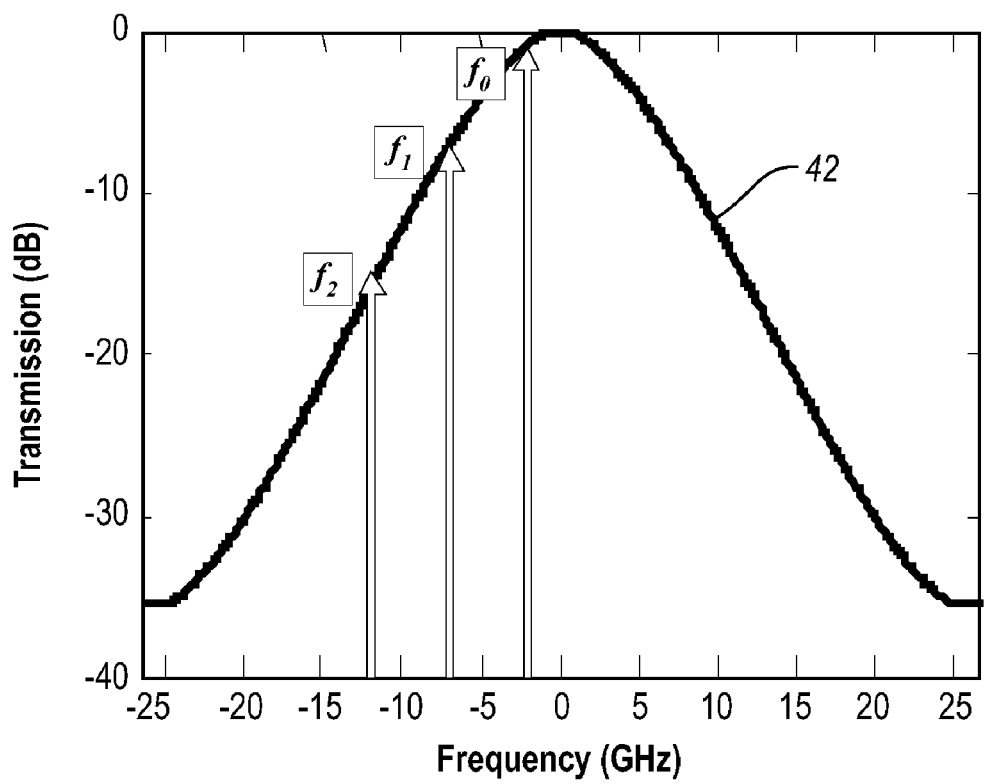
FIG. 3 is a plot of an optical spectrum reshaper transmission function and frequency levels used for phase modulation in accordance with an embodiment of the present invention.

FIG. 3 shows an example of an OSR transmission function 42 and the spectral positions of the various frequency values $f_0$-$f_2$ at the output of the FM source. Here the peak frequency, $f_0$, which corresponds to the highest amplitude is aligned with a relatively low loss point on the OSR 14, while the middle frequency $f_1$ is aligned to have higher loss (~10 dB). The frequency $f_2$ suffers higher loss because it is a lower frequency as shown in FIG. 3. Ideally the signal levels at the output 40 of the OSR 14 will be such that the 0 energy in the $f_1$ level and $f_2$ levels will be negligible (e.g. <−10 dB) below the energy in the peak of the 1s. In the illustrated embodiment, the OSR 14 may be used at its transmission edge and is also bandwidth limiting. A variety of OSR shapes can introduce discrimination between the various frequency components to generate the desired amplitude response after the OSR 14.

Importantly it should be noted that a key function of the OSR edge is the transformation of the adiabatic chirp at the output of the FM source 12 to flat-top chirp with abrupt phase shifts at the 0s, as has been described in U.S. Provisional Patent Application Ser. No. 60/548,230, filed Feb. 27, 2004 by Yasuhiro Matsui et al. for OPTICAL SYSTEM COMPRISING AN FM SOURCE AND A SPECTRAL RESHAPING ELEMENT; U.S. Provisional Patent Application Ser. No. 60/554,243, filed Mar. 18, 2004 by Daniel Mahgerefteh et al. for FLAT CHIRP INDUCED BY FILTER EDGE; U.S. patent application Ser. No. 11/084,630, filed Mar. 18, 2005 by Daniel Mahgerefteh et al. for FLAT-TOPPED CHIRP INDUCED BY OPTICAL FILTER EDGE; and U.S. patent application Ser. No. 11/084,633, filed Mar. 18, 2005 by Daniel Mahgerefteh et al. for METHOD AND APPARATUS FOR TRANSMITTING A SIGNAL USING SIMULTANEOUS FM AND AM MODULATION. The resulting uniform phase generated by the transfer function of the OSR 14 may advantageously be used to generate a RZ-DPSK signal with improved sensitivity.

Figure 4:
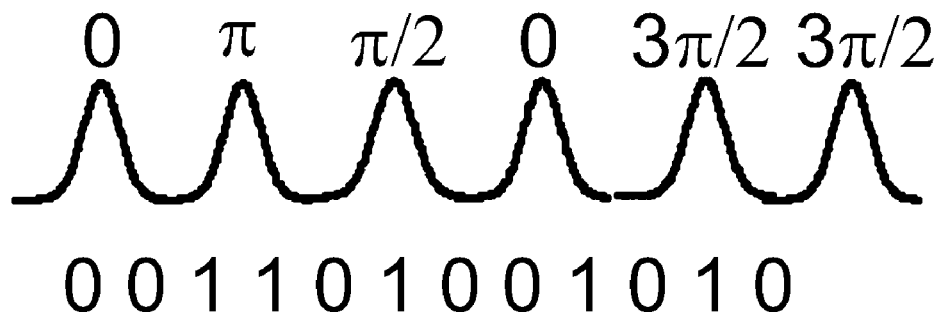
FIG. 4 is a plot of an output of one embodiment of a DQPSK output generated in accordance with an embodiment of the present invention.

Referring to FIG. 4, in alternative embodiments, the above described transmitter 10 may be used to generate a quadrature phase shift keyed signal (RZ-QPSK), for which the information is coded into four possible phases, such as $\{0, \pi/2, \pi, -\pi/2\}$. Each pulse may therefore be used to code two bits of information, i.e. 00, 01, 10, and 11, thereby doubling the rate of data transfer. In this case the multilevel digital transformer produces a four signal levels, $V_k$, such that the frequency $f_k$ of the phase modulated portions 36 satisfies the relation:

$$2\pi\Delta f_k \times T = \{2\pi, \pi/2, \pi, 3\pi/2\} \quad (3)$$

The OSR transmission function is preferably chosen such that after exiting the OSR 14, the phase modulated portion 36 of each bit is about <−1 dB below the amplitude of the fixed phase portions 38. In the case that the source has independent FM and AM modulation the amplitude may be adjusted to provide constant amplitude for the output pulses.

As is clear from the above two examples a variety of multilevel phase coded signals can be generated by using the scheme described above by adjusting the frequency excursion to generate the desired phase in the desired bit. The phase modulated portion 36 may have N frequency levels resulting in N possible phases for each fixed phase portion 38 in order to encode unique bit sequences of length $\log_2$ N. For example, an eight state PSK scheme may be used wherein each bit encodes three bits of data. In such a scheme, each fixed phase portion 38 may have a phase of $\{0, \pi/4, \pi/2, 3\pi/4, \pi, 5\pi/4, 3\pi/2\}$ each corresponding to a unique three bit sequence $\{000, 001, 010, 011, 100, 101, 110, 111\}$.

The pulses in the embodiment of FIG. 3 are return-to-zero (RZ). This means that the energy in the pulse occupies a fraction of the bit period (e.g. 50%), while the rest of the bit period carries no energy at all; i.e. the zero. Note that in the nomenclature of RZ-DPSK the zeros do not represent logical information. In other words, the 0 does not mean compliment of a 1. In RZ-DQPSK the output power reduced to the low ("zero") level between every two bits regardless of their value. Going forward we will call the "zero" level instead a low level, in order to avoid confusion with the logical 1s and 0s of the digital information.

In DQPSK, the desired changes in phase between bits, are $0, \pi/2, \pi,$ and $3\pi/2$. Because of the periodicity of phase, the phase shift can be shifted by an integer multiple of $2\pi$ without any change in final result. In other words, the set of phase values representing the four possible states of the incoming two bit word digital signals can be $2n\pi+(0, \pi/2, \pi,$ and $3\pi/2)$, n=0, 1, 2, 3, 4, where n is an integer.

As shown in Equation 3, the laser is driven to generate an chirp value such that the phase shift during the low level generates the desired change in optical phase satisfying; i.e. $2\pi\Delta f_k \times T = \{2\pi, \pi/2, \pi, 3\pi/2\}$. The chirp difference between the bits allows the use of the OSR 14 to generate a low level that is >10 dB below the high level for all the bits. In order to generate the low levels between two bits that are in phase; i.e. bit value 0, the above configuration of the FM source 12 requires that the phase shift be made to swing through $2\pi$, or some multiple of it, in order to generate a frequency shift between the two adjacent levels, which have the same phase and same amplitude. This increases the chirp requirements for the laser to be a maximum of 2× bit rate frequency; i.e. 20 GHz for a 10 Gb/s signal or 50 GHz for a 25 Gb/s signal with 50% duty cycle. In some cases this requirement makes laser design prohibitive.

Figure 5:
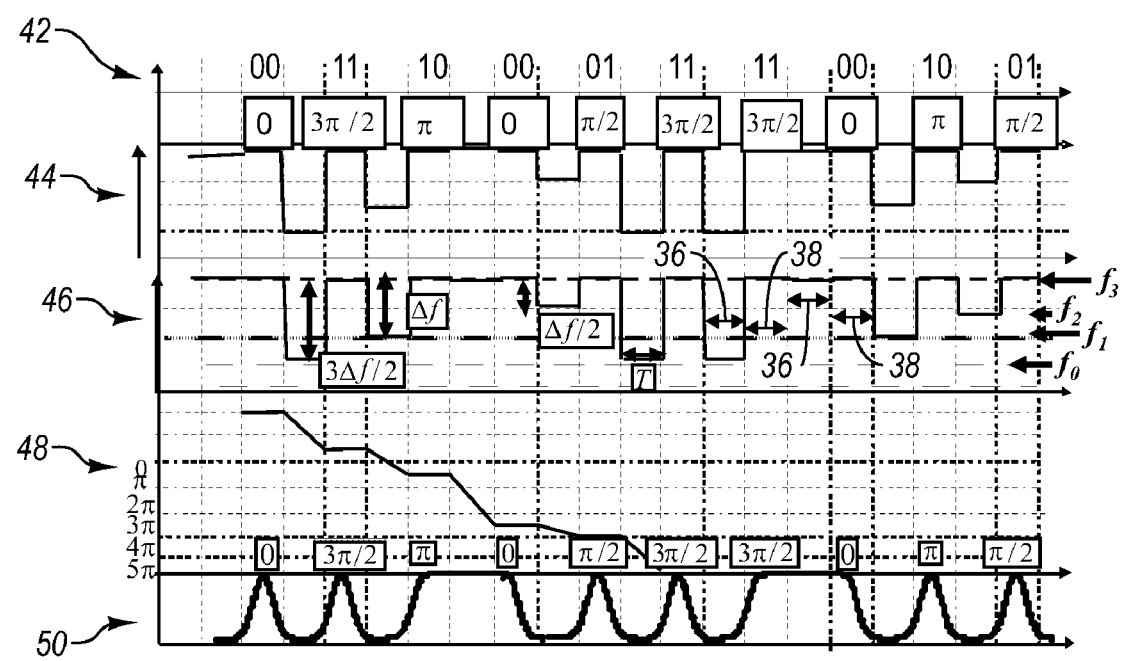
FIG. 5 is a timing diagram illustrating signal levels at points within a transmitter generated using an alternative method for generating a DQPSK signal in accordance with an embodiment of the present invention.

Accordingly, in the embodiment of FIG. 5, the requirements on the FM efficiency of the laser for generation of DPSK or DQPSK are relaxed by using a variation of the above described method in which no pulse is generated when the incoming bit is a 00; i.e. when the bit is 00, the driver output remains constant, such that the output of the FM source 12 during the entire duration of the 00 bit sequence will be equal to the frequency of the fixed phase portions 38. In some embodiments, a bit combination other than 00 is selected to generate no pulse.

FIG. 5 illustrates the values of a data signal 42, the output 44 of the DMT 20, the frequency profile 46 and phase progression 48 of the FM source 12, and the output 50 of the OSR 14 for such a differential quadrature phase shift keying (DQPSK) scheme. As is apparent in the output 50 of the OSR 14, for the 00 bit sequence, the output remains constant rather than dropping to the low interpulse level such that the phase modulated portion 36 and fixed phase portion 38 have about the same frequency.

Since the coding is differential, a 0 input phase requires that the output of the multi-level digital encoder remains unchanged. This scheme also reduces the number of output levels by one; i.e. the voltage only needs to swing to values V/2, V, and 3V/2. The corresponding frequency shifts are $f_2$, $f_1$, and $f_0$, respectively. The voltage is adjusted to generate the required chirp and depends on the FM efficiency of the laser. For a typical DFB laser the FM efficiency is typically 8-10 GHz/2V into a 50 ohm matching load resistance; i.e. 0.20-0.25 GHz/mA. Assuming the duration of the modulated phase portion of the signal to be T, the corresponding frequency shifts are given by $\Delta f=0$, 1/4T, 1/2T, and 3/4T to generate phase shifts of 0, $\pi/2$, $\pi$, and $3\pi/2$ respectively. For a 50% duty cycle RZ transmitter the duration of the phase modulated portion is half of the bit period, so that T=1/2B, where B is the bit rate, so that the required frequency shifts become $\Delta f=0$, B/2, B, and 3B/2.

In the embodiment of FIG. 5, the OSR filter 14 may advantageously be designed such as to attenuate the frequencies $f_2$, $f_1$, $f_0$ by more than 10 dB relative to the frequency $f_3$ of the fixed phase portions. The extinction ratio of the output levels will be determined by the sum of the AM extinction ratio and the extinction resulting from FM/AM conversion, which arises by adjusting the laser wavelength to be aligned with the transmission edge of the OSR filter.

As an example consider the case of B=10 Gb/s DQPSK and a DFB laser with a FM efficiency of 10 GHz/2V. Once a multi-level driver signal is generated, such a laser can be used together with an OSR filter 14 to generate DQPSK. This is because the required chirp values for 0, $\pi/2$, $\pi$, and $3\pi/2$ are 0, 2.5 GHz, 5 GHz, and 7.5 GHz, all of which can be supplied by a multi-level driver with 2 Vpp voltage.

Figure 6:
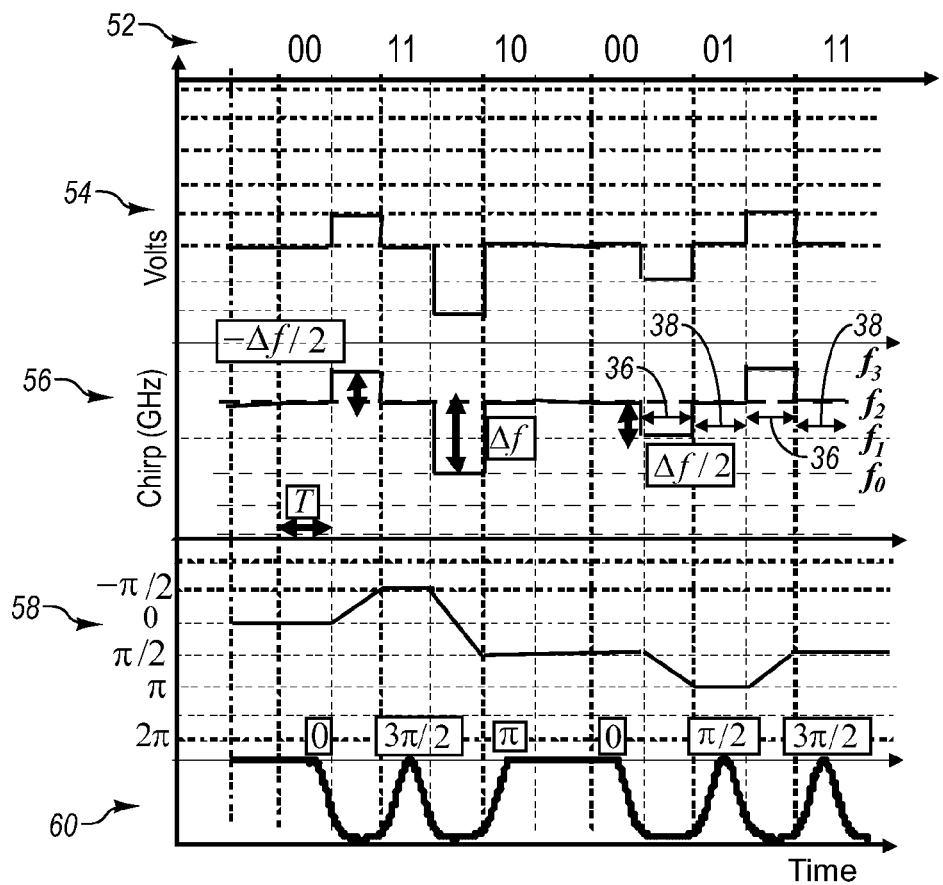
FIG. 6 is a timing diagram illustrating signal levels at points within a transmitter generated using another alternative method for generating a DQPSK signal in accordance with an embodiment of the present invention.

As noted above, the phase values representing DQPSK bits are modulo $2n\pi$. This property can be used to reduce the FM efficiency requirement on the laser, which can be advantageous since designing a high FM efficiency laser that can operate at high speeds can be challenging. FIG. 6 illustrates the values of a data signal 52, the output 54 of the multi-level digital transformer 20, the frequency profile 56 and phase progression 58 of the FM source 12, and the output 60 of the OSR 14 of a method for reducing the required FM efficiency in a DQPSK transmission scheme. In this case, the $3\pi/2$ phase is replaced by the equivalent $3\pi/2 - 2\pi = -\pi/2$. In order to generate a negative phase shift the driver generates a pulse that increases the chirp in an upward swing relative to the previous bit before returning to the high level value representing 0 phase. The phase modulated portion 36 of some pulses will therefore have a higher frequency than the frequency of the fixed phase portion 38. Assuming the duration of the modulated phase portion of the signal to be T, the corresponding frequency shifts are given by $\Delta f=0$, 1/4T, 1/2T, and −1/4T to generate phase shifts of 0, $\pi/2$, $\pi$, and $-\pi/2$ respectively. For a 50% duty cycle RZ transmitter the duration of the phase modulated portion is half of the bit period, so that T=1/2B, where B is the bit rate, so that the required frequency shifts become $\Delta f=0$, B/2, B, and −B/2.

Given an incoming bit rate of B, and assuming a 50% duty cycle RZ, the maximum required chirp is now equal to the bit rate B. For example for a 25 Gb/s incoming signal the maximum chirp is 25 GHz. The key difference is now that the chirp can swing down or swing up relative to the 0 chirp value of the high level.

Figure 7:
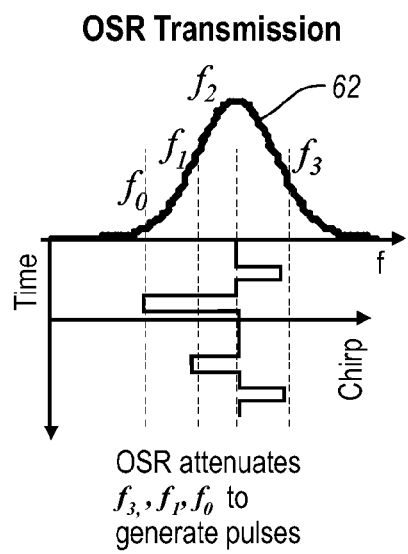
FIG. 7 is a plot of an optical spectrum reshaper transmission function and frequency levels used for phase modulation in accordance with the method of FIG. 6.

In this embodiment the OSR 14 and operating point relative to the input wavelength of the laser are preferably adjusted to attenuate the phase modulated portions 36. As shown in FIG. 7, in this embodiment, the laser center frequency $f_2$ corresponding to 0 phase change is aligned with the peak transmission of the transmission profile 62 of the OSR 14. The frequency up-shift frequency $f_3$ used to impose a $-\pi/2$ phase shift is aligned with the falling edge at the high frequency side of the transmission peak and the down shift frequencies $f_1$ and $f_0$ are aligned with the rising edge on the low frequency side of the transmission peak.

The OSR slope and bandwidth are preferably designed such that both the up-shifted and down shifted portions of the resulting signal at the output of the FM source 12 are attenuated by the OSR 14 during the low level between pulses. The result is a DQPSK signal that returns to zero when there is a phase transition between some or all bits. Although this method reduces the required FM efficiency of the source, it does impose a restrictive condition on the OSR design: the OSR bandwidth and slope are preferably adjusted so as to substantially attenuate the up-shift and down-shift components, while at the same time transmitting pulses with 50% duty cycle at the bit rate without significant pulse distortion or broadening. For example, for a 25 Gb/s input signal, the OSR slope preferably has a slope ~10 dB/12.5 GHz or ~0.8 dB/GHz, while having a bandwidth >25-30 GHz to pass the resulting pulse un-distorted, specifications that can be fulfilled by multi-cavity etalon filters.

Figure 8:
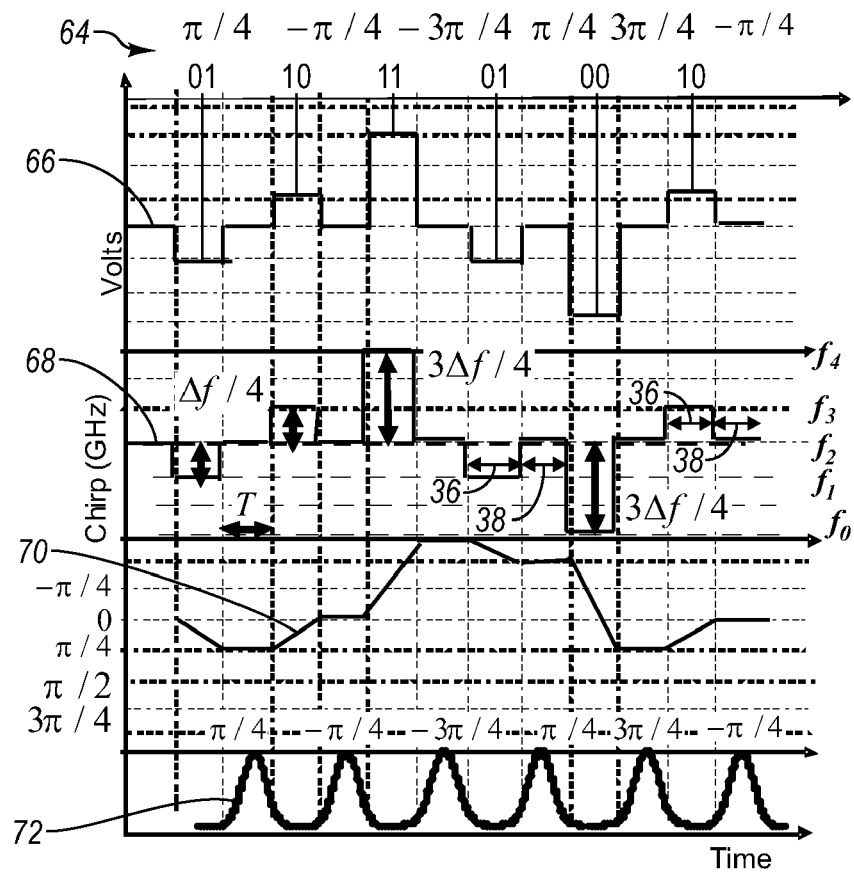
FIG. 8 is a timing diagram illustrating signal levels at points within a transmitter generated using another alternative method for generating a DQPSK signal in accordance with an embodiment of the present invention.

In a second method for decreasing the FM efficiency requirement for the laser source for a DQPSK transmitter, the phase shift concept is stretched one step further to make the chirp excursions symmetric about the 0 phase change condition. FIG. 8 shows the data signal 64, drive signal 66, frequency profile 68 and phase progression 70 of the laser output, and the output 72 of the OSR 14 illustrating this method. Note that the four phase values are $\pi/4$, $3\pi/4$, $-3\pi/4$ and $-\pi/4$. Here the maximum required chirp is 3B/4, where B is the bit rate, which is lower than that required for the above described schemes. Assuming the duration of the modulated phase portion of the signal to be T, the corresponding frequency shifts are given by $\Delta f=1/8T$, 3/8T, −1/8T, and −3/8T to generate phase shifts of $\pi/4$, $3\pi/4$, $-3\pi/4$, and $-\pi/4$ respectively. For a 50% duty cycle RZ transmitter the duration of the phase modulated portion is half of the bit period and the required frequency shifts become $\Delta f=B/4$, 3B/4, −B/4, and −3B/4.

For example compared to the value of 2B of the scheme illustrated in FIG. 2, the required chirp is reduced by ~2.6 times, which is a significant factor. At 10 Gb/s, for example the required maximum chirp is 7.5 GHz, which is readily available from standard DFB lasers using 40 mA peak-peak modulation.

Figure 9:
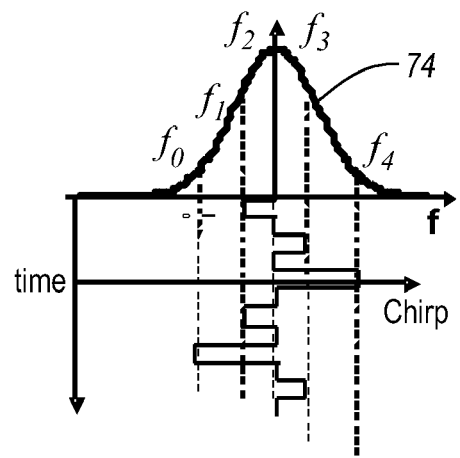
FIG. 9 is a plot of an optical spectrum reshaper transmission function and frequency levels used for phase modulation in accordance with the method of FIG. 8.

FIG. 9 shows the time resolved chirp and operating point on the transmission profile 74 of the OSR 14 for the symmetric chirp excursion scheme. The chirp swings down by amounts $\Delta f/4$ and $3\Delta f/4$ to generate phase values $\pi/4$ and $3\pi/4$ and swings up by equal amounts $\Delta f/4$ and $3\Delta f/4$ to generate phase values $-\pi/4$ and $-3\pi/4$. The laser center frequency $f_2$ is aligned with the peak transmission of the OSR transmission profile 74 so as to attenuate the up-swing frequencies $f_3$ and $f_4$ on the falling edge on the high frequency side of the OSR transmission profile 74 as well as the down swing frequencies $f_1$ and $f_0$ on the rising edge on the lower frequency side of the OSR transmission profile 74. Note that another advantage of the present embodiment is that return to zero pulses are generated for all bits since each bit corresponds to a non-zero phase transition and a corresponding chirp change, which allows pulse carving by the OSR 14.

While this method decreases the required FM efficiency of the laser, it requires different design criteria on the OSR 14. For example for a bit rate of 10 Gb/s, the OSR 14 is preferably designed to have an average slope of 10 dB/2.5 GHz~4 dB/GHz to be able to attenuate the smallest frequency excursion of 2.5 GHz by ~8-10 dB. At the same time, the OSR 14 preferably has a bandwidth high enough to pass a 10 Gb/s return-to-zero (RZ) pulse stream, which requires >10 GHz bandwidth. A multi-cavity filter can allow an increase in slope without decreasing bandwidth, however, a higher slope generally implies a smaller bandwidth, so that there may be design limitations to consider for the OSR 14 for 10 Gb/s. The OSR 14 for a 25 Gb/s system using the above scheme, preferably has a slope ~10 dB/6 GHz or ~1.6 dB/GHz and a bandwidth that allows >25 GHz bandwidth, which is easier to achieve using multi-cavity filters.

The various methods of DPSK generation above can be chosen depending on technology of the FM source and restrictions on the OSR design based on the selected filter technology. Candidate FM sources 12 include directly modulated distributed feedback laser (DFB), a directly gain modulated distributed Bragg reflector laser (DBR), vertical cavity surface emitting lasers (VCSELs) as well as the family of intra-cavity phase modulated (ICPM) lasers. The ICPM family of lasers includes any laser which includes a phase modulator section in its laser cavity that can be modulated at high speed. These include DBR lasers, sampled grating DBR lasers, modulated grating Y branch (MGY) lasers, external cavity lasers, and coupled cavity lasers with modulated phase section. The advantage of a phase modulated laser is that they may generate frequency modulation without any significant amplitude modulation, which relaxes the requirement on the OSR design.

The OSR 14 may include a multi-cavity etalon filter, a single or multi-cavity ring resonator filter, an arrayed waveguide grating (AWG) filter, and fiber Bragg grating filter.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for communicating data comprising:
   encoding the data in an output of a laser, the output having a series of pulse pairs each pulse pair having a phase modulated portion followed by a fixed phase portion, the phase modulated portion having a frequency shift relative to a carrier frequency, the frequency shift encoding at least one data symbol, and the fixed phase portion having a phase difference relative to a preceding pulse pair corresponding to the frequency shift of the phase modulated portion, the fixed phase portions of the signal having a frequency substantially equal to one another and to the carrier frequency;
   attenuating the output of the laser such that a plurality of the phase modulated portions are substantially more attenuated than the fixed phase portions; and
   transmitting the attenuated output to a receiver.

2. The method of claim 1, wherein for each pulse pair the frequency shift of the phase modulated portion is equal to either a first frequency shift causing the fixed-phase portion to have a phase difference of $\pi$ relative to the fixed phase portion of an immediately preceding fixed phase pulse or a second frequency shift causing the fixed phase portion to have a phase difference of $2\pi$ relative to the fixed phase portion of the preceding fixed phase pulse.

3. The method of claim 1, wherein the frequency shift of the phase modulated portion encodes a unique value of a data word.

4. The method of claim 3, wherein the phase modulated portions have a duration T and wherein their frequency shift is substantially equal to one of 1/4T, 1/2T, and 3/4T.

5. The method of claim 3, wherein the phase modulated portions have a duration T and wherein their frequency shift is substantially equal to any one of 1/4T, 1/2T, and −1/4T.

6. The method of claim 3, wherein the phase modulated portions have a duration T and wherein their frequency shift is substantially equal to one of 1/8T, 3/8T, −1/8T, and −3/8T.

7. The method of claim 1, wherein the pulse pairs are generated at a substantially constant bit rate B and wherein the phase modulated portions have a substantially constant duration T that is less than B.

8. The method of claim 7, wherein T is about equal to B/2.

9. The method of claim 1, wherein the frequency shift of each of the phase modulated portions is equal to either a first, second, third, or fourth frequency shift each encoding a different one of a 00, 01, 10, and 11 data sequence.

10. The method of claim 3, wherein the phase difference of each fixed phase portion relative to an immediately preceding fixed phase portion is about equal to one of $2\pi$, $\pi/2$, $\pi$, and $3\pi/2$.

11. The method of claim 3, wherein the frequency shift $\Delta f_k$ of each fixed phase portion approximately satisfies the relation $2\pi\Delta f_k \times T = \{2\pi, \pi/2, \pi, 3\pi/2\}$, where T is equal to a duration of the phase modulated portion.

12. The method of claim 3, wherein the phase difference of each fixed phase portion relative to an immediately preceding fixed phase portion is about equal to one of $2\pi$, $\pi/2$, $\pi$, and $-\pi/2$.

13. The method of claim 3, wherein the frequency shift $\Delta f_k$ of each fixed phase portion approximately satisfies the relation $2\pi\Delta f_k \times T = \{2\pi, \pi/2, \pi, -\pi/2\}$, where T is equal to a duration of the phase modulated portion.

14. The method of claim 3, wherein the first frequency shift is positive and the second frequency shift is negative.

15. The method of claim 3, wherein the phase difference of each fixed phase portion relative to an immediately preceding fixed phase portion is about equal to one of $\pi/4$, $3\pi/4$, $-3\pi/4$, and $-\pi/4$.

16. The method of claim 3, wherein the frequency shift $\Delta f_k$ of each fixed phase portion approximately satisfies the relation $2\pi\Delta f_k \times T = \{\pi/4, 3\pi/4, -3\pi/4, -\pi/4\}$, where T is equal to a duration of the phase modulated portion.

17. The method of claim 1, wherein attenuating the output of the laser such that a plurality of the phase modulated portions are more attenuated than the fixed phase portions comprises attenuating the plurality of the phase modulated portions at least about 10 dB more than the fixed phase portions.

18. The method of claim 1, wherein attenuating the output of the laser such that a plurality of the phase modulated portions are more attenuated than the fixed phase portions comprises transmitting the output through an optical filter having frequency dependent transmission.

19. The method of claim 18, wherein the optical filter has a transmission peak located substantially at the carrier frequency.

20. The method of claim 18, wherein the optical filter converts the fixed phase portions to pulses having a substantially flat topped frequency profile.

21. The method of claim 18, wherein the phase modulated portions have frequencies located on either side of a transmission peak of the optical filter and wherein the carrier frequency is located substantially at the transmission peak of the optical filter.

22. The method of claim 18, wherein the optical filter is a coupled multi-cavity filter.

23. An optical data transmission system comprising:
   a laser;
   a controller coupled to the laser and operable to modulate the laser to produce an output having a series of pulse pairs each pulse pair having modulated portions each followed by a fixed phase portion, each of the fixed phase portions having a frequency about equal to a same carrier frequency; and an optical filter optically coupled to the laser and having a frequency dependent transmission function attenuating a plurality of phase modulated portions more than the fixed phase portions.

24. The optical data transmission system of claim 23, further comprising a receiver optically coupled to the laser, the receiver comprising a phase detector operable to detect a phase difference between adjacent fixed phase portions and translate the phase difference into a received data signal.

25. The optical data transmission system of claim 24, further comprising an N-level digital transformer having an output coupled to the laser, the N-level digital transformer operable to receive a data signal to be transmitted by the laser and to produce an output encoding $\log_2 N$ bit data sequences in N signal levels.

26. The optical data transmission of claim 25, further comprising a bias signal source coupled to the laser, the output of the laser corresponding to a combination of an output of the bias signal source and the output of the N-level digital transformer.

27. The optical data transmission system of claim 23, wherein the controller is configured to modulate the laser such that the frequency shift of the phase modulated portions relative to the carrier frequency is equal to one of N frequency shifts relative to the carrier frequency, each frequency shift encoding a unique value of a $\log_2 N$ bit data word.

28. The optical data transmission system of claim 27, wherein at least one of the N frequency shifts is positive and at least one of the frequency shifts is negative.

29. The optical data transmission system of claim 28, wherein at least one of the N frequency shifts is about equal to zero.

30. The optical data transmission system of claim 27, wherein at least one of the N frequency shifts is about equal to zero.

31. The optical data transmission system of claim 27, wherein the optical filter has a spectral transmission profile effective to attenuate any of the N frequency shifts that are not equal to zero by at least about 10 dB relative to the carrier frequency.

32. The optical data transmission system of claim 27, wherein the optical filter has a transmission peak located substantially at the carrier frequency.

33. The optical data transmission system of claim 32, wherein at least a portion of the N frequency shifts are positive.

34. The optical data transmission system of claim 23, wherein the optical filter has a spectral transmission profile effective to convert the fixed phase portions to pulses having a substantially flat topped frequency profile.

35. The optical data transmission system of claim 23, wherein the optical filter is a coupled multi-cavity filter.

36. The optical data transmission system of claim 23, wherein the controller is configured to generate phase modulated portions having a frequency shift $\Delta f_k$ relative to the carrier frequency that approximately satisfies the relation $2\pi\Delta f_k \times T = \{2\pi, \pi/2, \pi, 3\pi/2\}$, where T is equal to a duration of the phase modulated portion.

37. The optical data transmission system of claim 23, wherein the controller is configured to generate phase modulated portions having a frequency shift $\Delta f_k$ relative to the carrier frequency that approximately satisfies the relation $2\pi\Delta f_k \times T = \{2\pi, \pi/2, \pi, -\pi/2\}$, where T is equal to a duration of the phase modulated portion.

38. The optical data transmission system of claim 23, wherein the controller is configured to generated phase modulated portions having a frequency shift $\Delta f_k$ relative to the carrier frequency that approximately satisfies the relation $2\pi\Delta f_k \times T = \{\pi/4, 3\pi/4, -3\pi/4, -\pi/4\}$, where T is equal to a duration of the phase modulated portion.

* * * * *